Nov. 8, 1927.
C. J. McINTOSH
1,648,416
METHOD OF WELDING STEEL SASH
Filed Nov. 1, 1926
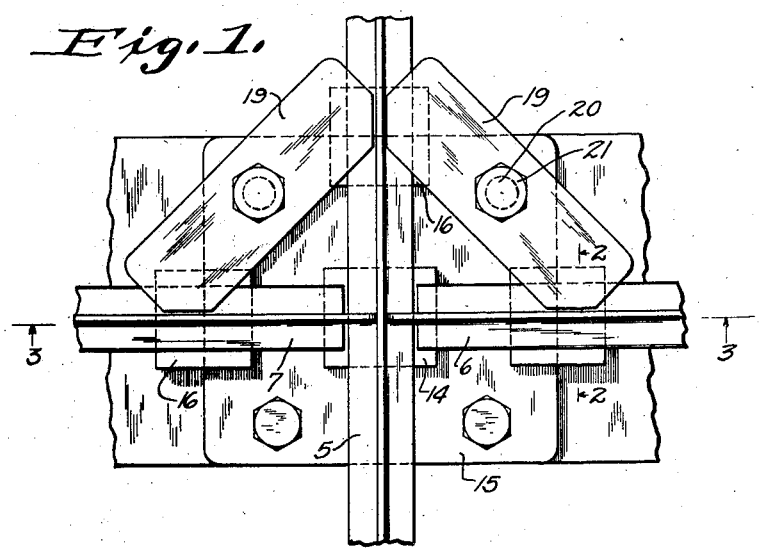
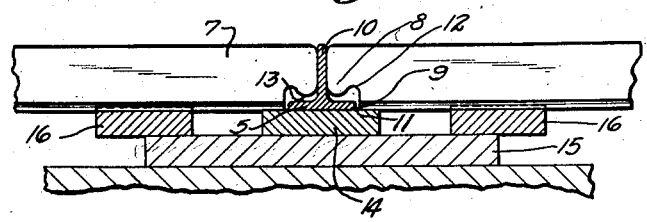
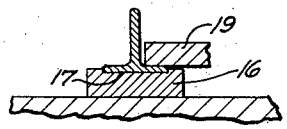 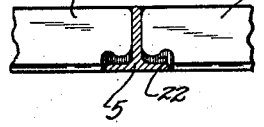
INVENTOR.
Charles J. McIntosh
BY
Charles & French
ATTORNEYS Patented Nov. 8, 1927.

1,648,416

UNITED STATES PATENT OFFICE.

CHARLES J. McINTOSH, OF MILWAUKEE, WISCONSIN, ASSIGNOR TO FEDERAL STEEL SASH COMPANY, OF WAUKESHA, WISCONSIN, A CORPORATION OF WISCONSIN.

METHOD OF WELDING STEEL SASH.

Application filed November 1, 1926. Serial No. 145,572.

The invention relates to a method of making steel sash and more particularly to the method of welding the angle bars forming the parts of the sash frame together.

The object of the invention is to provide a method whereby the sash members may be easily and quickly welded together by relatively unskilled labor and a perfect joint assured, as more particularly described in the following specification.

In the drawings Fig. 1 shows a detail plan view of a window-sash preparatory to welding the same;

Fig. 2 is a detail sectional view taken on the line 2—2 of Fig. 1;

Fig. 3 is a detail sectional view taken on the line 3—3 of Fig. 1;

Fig. 4 is a side elevation view of the welded joint contracting the metal forming the weld with the metal of the sash.

Steel sash usually consists of a number of bars of angular formation, such as angles, T's, and a combination of these, said bars being joined together to form a main frame and a window-light section on the sash and the present invention is directed to a method of expeditiously forming a welded joint between such bars.

As an illustration of my invention I have shown the method of welding a joint, either between two T-bars or between an angle bar and a T-bar, and as shown in Fig. 1 the numeral 5 designates a T-bar and 6 and 7 T-bars to be welded to the bar 5, it being noted that a joint is formed between each side of the T-bar 5 and the adjacent T-bars 6 or 7 so that half of the bar 5 may be considered the same as an angle bar.

As an initial step in forming the joint the T-bars, such as 6 and 7, are subjected to the action of suitable punching dies whereby a portion of the base or base flange of the bar is cut away so as to leave a tongue 8 of the web portion of this bar to project from the inner end 9 of the base to a position against or immediately adjacent to the web 10 of the bar 5, this tongue also providing for a clearance space or channel 11 between the base flange of the bar 5 and the base flange of the bar 6.

Furthermore, in providing the projection 8 of the web a pronounced recess or cope 12 is formed in the web adjacent the edge 9 of the bar 6 or 7 while the remaining portion of the projection 8 also clears the upper surface of the adjacent base flange of the bar 5 forming a clearance space 13. With the bars, such as the T-bars 6 and 7, prepared in this manner they, together with the bar 5, are clamped in assembled position at the joint or joints to be welded upon a chill-plate 14 mounted on a suitable support 15. To insure accurate alinement of the sash sections at the joint channel guides 16 having guide recesses 17 formed therein are secured to the support 15 and receive the bases of the T-bars or angle bars and since in most sash the frame members run at right angles to each other these guide members 16 are either at right angles to each other or disposed in the same plane, as shown in Fig. 1.

As a means for clamping the sash members in assembled position in the guides and against the chill-plate, I have shown clamps 19 held down against the flanges of adjacent sash members by bolts 20 secured to the support 15 and provided with cap-nuts 21, and it will be noted that a single clamping member holds the bars 5 and 6 in welding position relative to each other and that a similar clamping member holds the bars 5 and 7 in welding position relative to each other.

With the parts in position, as shown in Fig. 1, and with the parts forming the joint as shown more particularly in Fig. 3, the operator takes his electrically-heated pencil of welding metal and deposits the metal under welding heat in the space formed by the recess 11, the space 13 and the space below the cope 12, and as he runs the pencil along this space the metal is deposited therein and chilled by the plate 14. It has been found that unless the cope 12 is provided for the free passage of welding metal from one side of the T-bar on which the operator is working to the other that the heat evolved during welding is conducted away so fast that a good weld cannot be secured and that there is a tendency to form a cavity or hole in the sash just above the base of the bars that are being welded together.

After the weld has been made the excess metal on the web side of the sash is chiselled off by a pneumatic hammer whose blows are of such strength as to rupture the sash in case a perfect weld has not been made and hence this finishing operation serves as a test of the welded joints. In practice a pneumatic hammer using an air pressure of ninety pounds is used for this purpose for the usual steel sash. Any surplus metal of the weld that projects over the flat faces of the flanges of the sash members is removed by grinding, and the finished joint is shown in Fig. 4 wherein the welding metal is designated by the numeral 22 and contrasted with the metal of the bars which have been welded together.

By the term "web" as used in this application it will be understood that I mean the upstanding leg of an angle bar or the web portion of a T-bar or similar angle type bars.

It has been found that with the method above described steel sash may be produced on a basis to compete with die-punched and pressed sash and is, of course, considered stronger than such sash.

What I claim as my invention is:

1. The method of welding steel sash wherein the bars have a base portion and a web portion extending at an angle to their base portion, which consists in providing a projecting web portion of one of the bars extending over an adjacent base portion of the other bar and with a cope space in said projecting web portion above the bases of both bars permitting the welding metal to flow readily from one side of the web of the first-named bar to the other side thereof, securing these bars in proper angled relation with the bases at the joint against a chill-plate, and depositing the welding metal by an electric arc within the space between the base portions and the webs of said bars.

2. The method of welding angle type bars of steel sash together which consists in providing an extension of the web portion of one of the bars clear of the base thereof and clear of the bases of the adjacent bar with a greater clearance in the space between the bases of both bars at the joint, securing these bars in joint-forming relation with their base portions against a chill-plate, and depositing the welding metal by an electric arc in the clearance space between the web and bases of the bars to form the welded joint.

3. The method of making steel sash wherein bars of the angle type are welded together, which consists in providing a projecting web portion of one bar extending over the adjacent base portion of the other bar and with a cope space in such projecting web portion above the bases of both bars permitting the welding metal to flow rapidly from one side of the web of the first-named bar to the other side thereof, securing these bars in proper angled relation with the bases at the joint against a chill-plate, depositing the welding metal by an electric arc within the space between the base portions and webs of said bars, and removing the excess welding metal from the web portion sides of said bars by chiselling pressure sufficient to rupture imperfectly welded joints.

In testimony whereof, I affix my signature.

CHARLES J. McINTOSH.